US012687716B2

(12) United States Patent
Schmadtke et al.

(10) Patent No.: US 12,687,716 B2
(45) Date of Patent: Jul. 21, 2026

(54) PROJECTION ASSEMBLY FOR A HEAD-UP DISPLAY (HUD) WITH P-POLARIZED RADIATION

(71) Applicant: SAINT-GOBAIN GLASS FRANCE, Courbevoie (FR)

(72) Inventors: Lisa Schmadtke, Würselen (DE); Jan Hagen, Bonn (DE); Jefferson Do Rosario, Aachen (DE); Stephan Gillessen, Alsdorf (DE)

(73) Assignee: SAINT-GOBAIN SEKURIT FRANCE, Thourotte (FR)

( * ) Notice: Subject to any disclaimer, the term of this patent is extended or adjusted under 35 U.S.C. 154(b) by 529 days.

(21) Appl. No.: 18/044,014

(22) PCT Filed: Oct. 11, 2021

(86) PCT No.: PCT/EP2021/077996
§ 371 (c)(1),
(2) Date: Mar. 3, 2023

(87) PCT Pub. No.: WO2022/089921
PCT Pub. Date: May 5, 2022

(65) Prior Publication Data
US 2023/0415571 A1     Dec. 28, 2023

(30) Foreign Application Priority Data
Oct. 28, 2020     (EP) ..................................... 20204443

(51) Int. Cl.
*G02B 27/01*     (2006.01)
*B32B 17/10*     (2006.01)
(Continued)

(52) U.S. Cl.
CPC ........ *G02B 27/01* (2013.01); *B32B 17/10036* (2013.01); *B60K 35/00* (2013.01);
(Continued)

(58) Field of Classification Search
CPC .. B60K 35/00; B60K 35/23; B60K 2360/334; B60K 2360/785; G02B 27/0101; G02B 27/01; B32B 17/10036; B32B 17/10229
See application file for complete search history.

(56) References Cited

U.S. PATENT DOCUMENTS

| 12,174,374 B2 * | 12/2024 | Hagen ............... B32B 17/10229 |
| 2015/0291812 A1 * | 10/2015 | Anapolsky .......... C03C 17/3644 |
| | | 427/596 |

(Continued)

FOREIGN PATENT DOCUMENTS

| CN | 104126135 A | 10/2014 |
| CN | 104267499 A | 1/2015 |

(Continued)

OTHER PUBLICATIONS

International Search Report as issued in International Patent Application No. PCT/EP2021/077996, dated Dec. 23, 2021.
(Continued)

*Primary Examiner* — Jia X Pan
(74) *Attorney, Agent, or Firm* — CUSHMAN PARTNERS, LLC

(57) ABSTRACT

A projection assembly for a head-up display (HUD), includes a windshield with an HUD region, inner and outer panes joined via a thermoplastic intermediate layer, and a projector directed at the HUD region having a radiation predominantly p-polarized. The windshield has a reflection coating for reflecting p-polarized radiation. The reflection coating has exactly one electrically conductive layer based on silver. A lower dielectric layer or layer sequence with a refractive index of at least 1.9 is arranged below the electrically conductive layer. An upper dielectric layer or layer sequence with a refractive index of at least 1.9 is arranged above the electrically conductive layer. The ratio of the optical thickness of the upper dielectric layer or layer (Continued)

Figure 1:
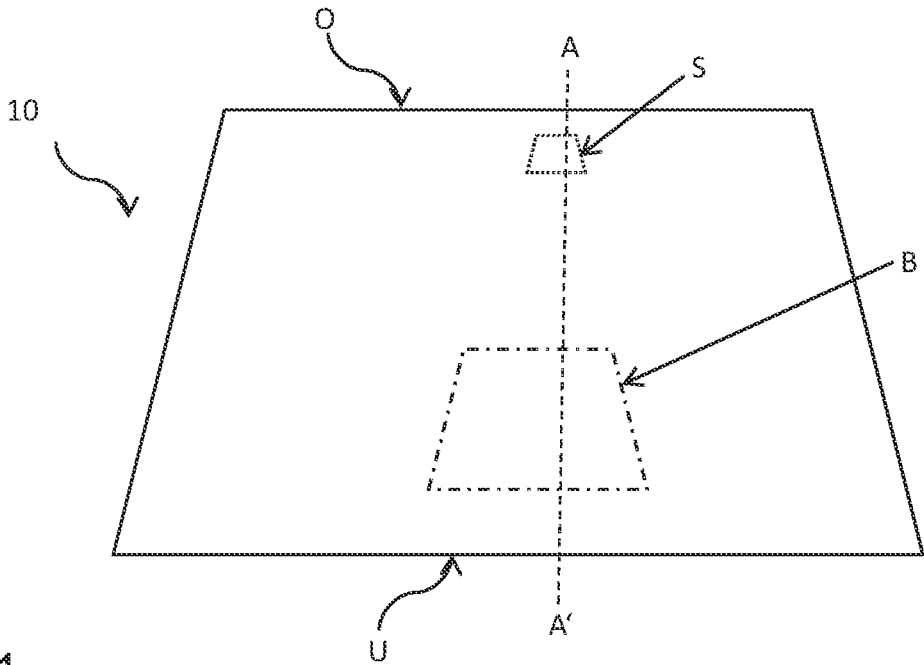

sequence to the optical thickness of the lower dielectric layer or layer sequence is between 2.10 and 3.20. The reflection coating includes no dielectric layers with a refractive index less than 1.9.

19 Claims, 3 Drawing Sheets

(51) Int. Cl.
  B60K 35/00 (2024.01)
  B60K 35/23 (2024.01)
  B60K 35/60 (2024.01)
(52) U.S. Cl.
  CPC .............. B60K 35/23 (2024.01); B60K 35/60 (2024.01); G02B 27/0101 (2013.01); B60K 2360/334 (2024.01); B60K 2360/785 (2024.01)

(56) References Cited

U.S. PATENT DOCUMENTS

| | | | |
|---|---|---|---|
| 2017/0242247 A1 * | 8/2017 | Tso ........................ | B60K 35/23 |
| 2019/0064516 A1 | 2/2019 | Wagner et al. | |
| 2019/0263315 A1 * | 8/2019 | Melcher ............ | B32B 17/10165 |
| 2019/0329523 A1 * | 10/2019 | Schmalbuch ............. | B32B 3/08 |
| 2023/0280588 A1 * | 9/2023 | Diguet ...................... | B32B 1/00 |
| | | | 359/630 |
| 2024/0210686 A1 * | 6/2024 | Schmadtke ....... | B32B 17/10036 |

FOREIGN PATENT DOCUMENTS

| | | | | |
|---|---|---|---|---|
| CN | 111051958 A | | 4/2020 | |
| CN | 111356949 A | | 6/2020 | |
| CN | 114667476 A | | 6/2022 | |
| DE | DE 10 2014 220189 A1 | | 4/2016 | |
| EP | DR EP 1 880 243 A2 | | 1/2008 | |
| EP | EP 1 800 855 B1 | | 2/2013 | |
| WO | WO 2006/122305 A2 | | 11/2006 | |
| WO | WO 2009/071135 A1 | | 6/2009 | |
| WO | WO 2016/058474 A1 | | 4/2016 | |
| WO | WO 2019/016548 A1 | | 1/2019 | |
| WO | WO 2019/046157 A1 | | 3/2019 | |
| WO | WO-2020083649 A1 * | | 4/2020 | ....... B32B 17/10036 |
| WO | WO-2021104800 A1 * | | 6/2021 | ....... B32B 17/10036 |
| WO | WO-2022058178 A1 * | | 3/2022 | ......... G02B 27/0101 |
| WO | WO-2022073787 A1 * | | 4/2022 | ............. G03B 30/00 |
| WO | WO-2022083988 A1 * | | 4/2022 | ......... G02B 27/0101 |
| WO | WO-2022223198 A1 * | | 10/2022 | ....... B32B 17/10761 |

OTHER PUBLICATIONS

Neumann, A., "Simulation-Based Metrology for Testing Head-Up Displays," Dissertation at the Informatics Institute of Munich Technical University (Munich: University Library of Munich TU, 2012), in particular chapter 2 "The Head-Up Display", (2012), Retrieved from the Internet: URL: <https://mediatum.ub.tum.de/1079689?id=10979689&change_language=en>. (English abstract on p. 5 of document).

* cited by examiner

PROJECTION ASSEMBLY FOR A HEAD-UP DISPLAY (HUD) WITH P-POLARIZED RADIATION

CROSS-REFERENCE TO RELATED APPLICATIONS

This application is the U.S. National Stage of PCT/EP2021/077996, filed Oct. 11, 2021, which in turn claims priority to European patent application number 20204443.4 filed Oct. 28, 2020. The content of these applications are incorporated herein by reference in their entireties.

The invention relates to a projection assembly for a head-up display and its use.

Modern automobiles are increasingly equipped with so-called head-up displays (HUDs). With a projector, typically in the region of the dashboard, images are projected onto the windshield, reflected there, and perceived by the driver as a virtual image behind the windshield (from his perspective). Thus, important data can be projected into the driver's field of vision, for example, the current driving speed, navigation or warning messages, which the driver can perceive without having to take his eyes off the road. Head-up displays can thus contribute significantly to an increase in traffic safety.

HUD projectors are predominantly operated with s-polarized radiation and irradiate the windshield with an angle of incidence of about 65%, which is near Brewster's angle for an air/glass transition (56.5° for soda lime glass). The problem arises that the projector image is reflected on both external surfaces of the windshield. As a result, in addition to the desired primary image, a slightly offset secondary image also appears, the so-called ghost image ("ghost"). The problem is usually mitigated by arranging the surfaces at an angle relative to one another, in particular by using a wedge-like intermediate layer for the lamination of windshields implemented as a composite pane such that the primary image and the ghost image are superimposed on one another. Composite glasses with wedge films for HUDs are known, for example, from WO2009/071135A1, EP1800855B1, or EP1880243A2.

The wedge films are expensive such that production of such a composite pane for an HUD is quite cost intensive. Consequently, there is a need for HUD projection assemblies that work with windshields without wedge films. For example, it is possible to operate the HUD projector with p-polarized radiation, which is not significantly reflected by the pane surfaces. Instead, the windshield has a reflection coating as a reflection surface for the p-polarized radiation. DE102014220189A1 discloses such an HUD projection assembly that is operated with p-polarized radiation. Proposed, among other things, as a reflecting structure is a single metallic layer with a thickness of 5 nm to 9 nm, made, for example, of silver or aluminum. WO2019046157A1 also discloses an HUD with p-polarized radiation, wherein a reflection coating with at least two metallic layers is used.

US2017242247A1 discloses another HUD projection assembly with a reflection coating for p-polarized radiation. The reflection coating can contain one or more conductive silver layers, as well as dielectric layers. However, in the relevant spectral range, the reflection spectrum has a significantly curved shape such that the reflectance is relatively strongly wavelength dependent. This is disadvantageous with regard to a color-neutral display of the HUD projection. WO2020083649A1 discloses a projection assembly for a vehicle comprising a vehicle side window with reflection coating and a projector, wherein the radiation of the projector is predominantly p-polarized and the reflection coating is suitable for reflecting p-polarized radiation.

The data shown in the HUD, such as speed or even distance to vehicles ahead, are determined by the driving assistance systems integrated in the vehicle. Such driving assistance systems are becoming increasingly more significant with the increasing development of autonomous driving vehicles such that newly developed vehicle glazings must obviously be compatible with them. Modern driving assistance systems are often also referred to by the term ALIAS (Advanced Driver Assistance Systems) and use, for example, ultrasound, radar, lidar, and/or camera technology. Depending on the type and application of the sensors, they are also attached in the region of the vehicle glazing, for example, behind the windshield of a vehicle. Care must be taken to ensure that the corresponding vehicle glazing has good transmittance of the radiation to be detected by the sensor. In addition, these sensors operate with polarization contrast, i.e., they exploit the different transmittance of s- and p-polarized radiation, One measure of this is the so-called polarization ratio, i.e., the quotient of p-polarized to s-polarized radiation intensity. Any coatings of the vehicle glazing, such as heating layers or reflection coatings, are usually associated with reduced transmittance. To ensure adequate function of a sensor behind such a coating, the coating can, for example, be removed locally. This results in additional steps and costs in the manufacturing process. Furthermore, the decoated region is detectable in reflection.

Accordingly, there is a need for projection assemblies for HUDs having reflection coatings that have high reflectivity for p-polarized radiation and, at the same time, have sufficiently high transmittance and a high polarization ratio for camera systems situated behind the glazing. The object of the present invention is to provide such an improved projection assembly.

The object of the present invention is accomplished according to the invention by a projection assembly in accordance with claim 1. Preferred embodiments are are apparent from the dependent claims.

According to the invention, p-polarized radiation is used for generating the HUD image, and the composite pane has a reflection coating that sufficiently reflects p-polarized radiation. Since the angle of incidence of about 65° typical for HUD projection assemblies is relatively close to Brewster's angle for an air/glass transition (56.5°, soda lime glass), p-polarized radiation is hardly reflected by the pane surfaces, but instead primarily by the conductive coating. Consequently, ghost images do not occur or are hardly perceptible such that the use of an expensive wedge film can be dispensed with. In addition, the HUD image is recognizable even for wearers of polarization-selective sunglasses, which typically allow only p-polarized radiation to pass through and block s-polarized radiation. The reflection coating according to the invention is responsible for high reflectivity for p-polarized radiation in the spectral range from 450 nm to 650 nm, which is relevant for HUD displays (HUD projectors typically operate at wavelengths of 473 nm, 550 nm, and 630 nm (RGB)). This results in a high-intensity HUD image. The single silver layer does not excessively reduce light transmittance such that the pane can still be used as a windshield. The ratio according to the invention of the optical thicknesses of the upper and lower dielectric layer sequence causes a smoothing of the reflection spectrum such that a color-neutral display of the HUD image is ensured. The advantageous reflection properties, in particular the uniformity of the spectrum, extend even beyond the HUD-relevant spectral range to a spectral range from 400 nm to 680 nm such that in addition to a good HUD display, a positive overall impression of the pane without a disturbing color cast is achieved. In addition to the advantageous HUD properties of the windshield, it has optimized sensor compatibility, in particular camera compatibility. In experiments by the inventors, a ratio of the optical thickness of the upper dielectric layer or layer sequence to the optical thickness of the lower dielectric layer or layer sequence between 2.10 and 3.20 resulted in an advantageous ratio of p-polarized transmitted light to s-polarized transmitted light. The reflection coating includes no dielectric layers with a refractive index of less than 1.9. In other words, all dielectric layers of the reflection coating have a refractive index of at least 1.9.

The projection assembly according to the invention for a head-up display (HUD) includes at least a windshield, which is provided with a reflection coating, and a projector. As is usual with HUDs, the projector irradiates a region of the windshield where the radiation is reflected in the direction of the viewer (driver), generating a virtual image, which the viewer perceives, from his perspective, as behind the windshield. The region of the windshield that can be irradiated by the projector is referred to as the HUD region. The beam direction of the projector can typically be varied by mirrors, in particular vertically, in order to adapt the projection to the body size of the viewer. The region in which the eyes of the viewer must be situated with a given mirror position is referred to as the "eyebox window", This eyebox window can be shifted vertically by readjustment of the mirrors, with the entire region thus available (i.e., the superimposing of all possible eyebox windows) referred to as the "eyebox". A viewer situated within the eyebox can perceive the virtual image. This, of course, means that the eyes of the viewer must be situated within the eyebox, not the entire body.

The projection assembly for an HUD according to the invention is particularly suitable for attaching a sensor to the windshield, in particular sensors in the field of ADAS systems. The term ADAS systems refers to modern driving assistance systems that use, for example, surround sensor technology based on ultrasound, radar, lidar, and/or camera technology. One or more of these or other sensors can be affixed in the region of the windshield.

The technical terms used here from the field of HUDs are generally known to the person skilled in the art. For a detailed presentation, reference is made to Alexander Neumann's dissertation "Simulation-Based Measurement Technology for Testing Head-Up Displays" at the Institute of Computer Science at the Technical University of Munich (Munich: University Library of the Technical University of Munich, 2012), in particular Chapter 2 "The Head-Up Display".

The windshield comprises an outer pane and an inner pane that are joined to one another via a thermoplastic intermediate layer. The windshield is intended, in a window opening of a vehicle to separate the interior from the outside environment. In the context of the invention, the term "inner pane" refers to the pane of the windshield facing the vehicle interior. The term "outer pane" refers to the pane facing the external surroundings. The windshield is preferably the windshield of a motor vehicle, in particular of a passenger car or a truck.

The windshield has an upper edge and a lower edge as well as two side edges extending therebetween, "Upper edge" refers to that edge that is intended to point upward in the installed position. "Lower edge" refers to that edge that is intended to point downward in the installed position. The upper edge is also often referred to as the "roof edge"; and the lower edge, as the "engine edge".

The outer pane and the inner pane have in each case an exterior-side surface and an interior-side surface and a peripheral side edge extending therebetween. In the context of the invention, "exterior-side surface" refers to that primary surface that is intended, in the installed position, to face the external surroundings. In the context of the invention, "interior-side surface" refers to that primary surface that is intended, in the installed position, to face the interior. The interior-side surface of the outer pane and the exterior-side surface of the inner pane face each other and are joined to one another by the thermoplastic intermediate layer.

The projector is directed toward the HUD region of the windshield. The radiation of the projector is predominantly p-polarized. The reflection coating is suitable for reflecting p-polarized radiation. As a result, a virtual image which the driver of the vehicle can perceive as behind the windshield from his perspective is generated from the projector radiation.

The reflection coating according to the invention has exactly one electrically conductive layer based on silver. "Exactly one conductive layer based on silver" means that the reflection coating according to the invention contains only this one conductive layer based on silver and includes no other conductive layers based on silver. This also includes the fact that, according to the invention, on the substrate on which the reflection coating is applied, no silver-containing layers are present either below or above the reflection coating according to the invention. A lower dielectric layer or layer sequence is arranged below the electrically conductive layer. Likewise, an upper dielectric layer or layer sequence is arranged above the electrically conductive layer. The upper and the lower dielectric layer or layer sequence have in each case a refractive index that is at least 1.9.

In the context of the present invention, refractive indices are generally indicated in relation to a wavelength of 550 nm. The optical thickness is the product of the geometric thickness and the refractive index (at 550 nm), The optical thickness of a layer sequence is calculated as the sum of the optical thicknesses of the individual layers. The refractive index can, for example, be determined by means of ellipsometery. Ellipsometers are commercially available, for example, from the company Sentech. The refractive index of an upper or lower dielectric layer is preferably determined by first depositing it on a substrate as a single layer and then measuring the refractive index by ellipsometery. To determine the refractive index of an upper or lower dielectric layer sequence, the layers of the layer sequence are in each case deposited alone as single layers on a substrate and then the refractive index is determined by ellipsometery, According to the invention, a refractive index of at least 1.9 must be achieved for each of these individual layers. Dielectric layers with a refractive index of at least 1.9 as well as methods for their deposition are known to the person skilled in the art in the field of thin films. Preferably, methods of physical vapor deposition, in particular magnetron sputtering, are used.

In the context of the invention, if a first layer is arranged "above" a second layer, this means that the first layer is arranged farther from the substrate on which the coating is applied than the second layer. In the context of the invention, if a first layer is arranged "below" a second layer, this means that the second layer is arranged farther from the substrate than the first layer.

When a layer is based on a material, the layer consists for the most part of this material, in particular substantially of this material in addition to any impurities or dopants.

According to the invention, the ratio of the optical thickness of the upper dielectric layer or layer sequence to the optical thickness of the lower dielectric layer or layer sequence is between 2.10 and 3.20. It has been shown that such asymmetry of the optical thicknesses results, on the one hand, in a significantly smoother reflection spectrum for p-polarized radiation such that there is relatively constant reflectance over the entire relevant spectral range (400 nm to 680 nm). This ensures a color-neutral display of the HUD projection and a color-neutral overall impression of the pane. In addition, a particularly advantageous polarization ratio of p-polarized light to s-polarized light has been shown in this small ratio range of optical thicknesses. The polarization ratio is defined as the ratio of the transmittance of p-polarized light to the transmittance of s-polarized light. A sensor, for example, a camera, in whose beam path the reflection coating according to the invention is situated, can perceive only the light transmitted by the reflective coating, as result of which, high transmittance is desirable when using a sensor behind the windshield. In particular, the transmittance of p-polarized light should predominate compared to s-polarized light and should be as high as possible. The polarization ratio of the transmitted light is crucial in order to avoid glare effects that can occur with wet road conditions and can limit the camera view. In order to suppress these glare effects, the transmittance of the p-polarized light must outweigh the transmittance of s-polarized light. The requirement for good HUD image quality, which makes high reflectance of p-polarized light at the reflection coating necessary, thus runs counter to the high transmittance desired for camera applications. The inventors have found that within the ratios of optical thicknesses according to the invention, sufficient reflectance for p-polarized light for HUD applications can be achieved and, at the same time, the light transmitted through the windshield has an advantageous ratio of p-polarized light to s-polarized light. Within the narrow limits of the ratios of optical thicknesses mentioned, a projection assembly for a head-up display optimized for camera applications is thus attainable.

The ratio of the optical thicknesses according to the invention is calculated as the quotient of the optical thickness of the upper dielectric layer or layer sequence (dividend) divided by the optical thickness of the lower dielectric layer or layer sequence (divisor).

In a preferred embodiment, the ratio of the optical thickness of the upper dielectric layer or layer sequence to the optical thickness of the lower dielectric layer or layer sequence is between 2.14 and 3.10, preferably between 2.20 and 3.10, particularly preferably between 2.30 and 2.98, in particular between 2.50 and 2.97. This yields particularly good results.

Preferably, by means of the reflection coating according to the invention, a polarization ratio of p-polarized light to s-polarized light is achieved that is at least 1.28 with a transmittance angle of 55°, at least 1.41 with a transmittance angle of 61°, and/or at least 1.59 with a transmittance angle of 67°. The transmittance angle is the angle at which a beam passing through the windshield is transmitted. The transmittance angle is determined as the angle between the surface normal of the windshield and outgoing transmitted beam. A sensor provided behind the windshield is preferably provided at the transmittance angle for which the reflection coating is optimized. The limit values mentioned for the polarization ratio correspond to the specifications of the relevant camera systems. Particularly preferably, at least two of the limit values mentioned for the polarization ratio are achieved. In particular, all three of the limit values mentioned for the polarization ratio are achieved by the reflection coating according to the invention. This is advantageous since, in this way, one camera can be used at different transmittance angles.

The windshield of the projection assembly according to the invention preferably includes a sensor region. A sensor can be affixed in this sensor region such that radiation passes through the reflection coating and is detected by the sensor. Already at the time of manufacture, the projection assembly is preferably provided with a sensor that detects radiation passing through the windshield in the sensor region. The windshield of the projection assembly according to the invention is, however, also advantageous for retrofitting sensors or use of the dashboard-mounted cameras (also referred to as "dashcams"). The reflection coating according to the invention is optimized in terms of its compatibility with camera systems, as a result of which a camera can be provided at any location. The decoating of a camera window can be dispensed with.

If the projection assembly according to the invention has a sensor, the reflection coating is situated in the beam path of the sensor. The sensor is generally provided behind the windshield, i.e., in the installed state of the windshield, in the interior of the vehicle, and is preferably attached adjacent the outer face of the inner pane. The sensor is preferably an ultrasound sensor, a radar sensor, a lidar sensor, and/or a camera. The sensor is particularly preferably a camera that detects radiation in the visible range of the light spectrum. The reflection coating according to the invention achieves the limit values required in the specifications of relevant camera systems for the ratio of p-polarized transmitted light to s-polarized transmitted light.

The reflection coating is preferably applied to one of the surfaces of the two panes facing the intermediate layer, i.e., the interior-side surface of the outer pane or the exterior-side surface of the inner pane. Alternatively, the reflection coating can also be arranged within the thermoplastic intermediate layer, for example, applied to a carrier film that is arranged between two thermoplastic bonding films. The reflection coating is transparent, meaning, in the context of the invention, that it has average transmittance in the visible spectral range of at least 70%, preferably at least 80%, and thus does not substantially restrict vision through the pane. Subregions or even large-area regions can be provided with the reflection coating and the windshield can be provided with the reflection coating essentially over its entire surface, which may be preferred for manufacturing reasons. In one embodiment of the invention, at least 80% of the pane surface is provided with the reflection coating according to the invention. In particular, the reflection coating is applied to the pane surface over its entire surface with the exception of a peripheral edge region and, optionally, a local region intended to ensure the transmittance of electromagnetic radiation through the windshield as communication windows, sensor windows, or camera windows, and, consequently, not provided with the reflection coating. The peripheral uncoated edge region has, for example, a width of up to 20 cm. It prevents direct contact of the reflection coating with the surrounding atmosphere such that the reflection coating is protected, inside the windshield, against corrosion and damage.

The reflection coating according to the invention has IR-reflecting properties due to the electrically conductive silver layer such that it functions as a sun protection coating that reduces the heating of the vehicle interior by reflecting thermal radiation. The reflection coating can also be used as a heating coating when it is electrically contacted such that a current flows through it, heating the reflection coating.

In the spectral range from 400 nm to 680 nm, the windshield provided with the reflection coating preferably has an averaged reflectance for p-polarized radiation of at least 15%, particularly preferably of at least 20%. This produces a sufficiently high-intensity projection image. The reflectance is measured with an angle of incidence of 65° relative to the interior-side surface normal, which corresponds approx. to the irradiation from conventional projectors. The spectral range from 400 nm to 680 nm was used to characterize the reflection properties because the optical impression of a viewer is primarily shaped by this spectral range. It also covers the relevant wavelengths for the HUD display (RGB: 473 nm, 550 nm, 630 nm). The high reflectance, along with a relatively simple layer structure, is a major advantage of the present invention. Particularly good results are achieved when the reflectance in the entire spectral range from 400 nm to 680 nm is at least 15%, preferably at least 20%, such that the reflectance in the specified spectral range is not below the specified values at any point.

Reflectance describes the proportion of the total incident radiation that is reflected. It is indicated in % (based on 100% incident radiation) or as a unitless number from 0 to 1 (formed to the incident radiation). Plotted as a function of the wavelength, it forms the reflection spectrum. In the context of the present invention, the statements concerning reflectance for p-polarized radiation are based on the reflectance measured with an angle of incidence of 65° relative to the interior-side surface normal. The data regarding the reflectance or the reflection spectrum are based on a reflection measurement with a light source that emits uniformly with a normed radiation intensity of 100% in the spectral range under consideration.

In order to achieve the most color-neutral display of the projector image possible, the reflection spectrum should be as smooth as possible and should have no pronounced local minima and maxima. In the spectral range from 400 nm to 680 nm, the difference between the maximally occurring reflectance and the mean of the reflectance as well as the difference between the minimally occurring reflectance and the mean of the reflectance in a preferred embodiment should be at most 3%, particularly preferably at most 2%. Here again, the reflectance for p-polarized radiation is measured with an angle of incidence of 65° relative to the interior-side surface normal. The resultant difference is to be considered as the absolute deviation of reflectance (reported in %), not as a percentage deviation relative to the mean. The specified smoothness of the reflection spectrum can easily be achieved with the reflection coating according to the invention due to its electrically conductive layer.

Alternatively, the standard deviation in the spectral range from 400 nm to 680 nm can be used as a measure of the smoothness of the reflection spectrum. It is preferably less than 1%, particularly preferably less than 0.9%, most particularly preferably less than 0.8%.

The above-mentioned desired reflection characteristics are achieved in particular through the choice of the materials and thicknesses of the individual layers as well as the structure of the dielectric layer sequences. The reflection coating can thus be suitably adjusted.

The reflection coating is a thin-layer stack, i.e., a layer sequence of thin individual layers. This thin-layer stack contains exactly one electrically conductive layer, based on silver. The electrically conductive layer based on silver gives the reflection coating the basic reflecting properties and also an IR-reflecting effect and electrical conductivity. The electrically conductive layer based on silver can also be referred to simply as a silver layer. The reflection coating contains exactly one silver layer, i.e., not more than one silver layer, and also no other silver layers are arranged above or below the reflection coating. It is a particular advantage of the present invention that the desired reflection properties can be achieved with one silver layer without excessively reducing the transmittance, as would be the case if multiple conductive layers were used. However, it is also possible for other electrically conductive layers that do not substantially contribute to the electrical conductivity of the reflection coating but serve a different purpose to be present. This applies in particular to metallic blocking layers with geometric thicknesses less than 1 nm, which are preferably arranged between the silver layer and the dielectric layer sequences.

The electrically conductive layer is based on silver. The conductive layer preferably contains at least 90 wt.-% silver, particularly preferably at least 99 wt.-% silver, most particularly preferably at least 99.9 wt.-% silver. The silver layer can have dopants, for example, palladium, gold, copper, or aluminum. The geometric layer thickness of the silver layer is preferably at most 15 nm, particularly preferably at most 14 nm, most particularly preferably at most 13 nm. As a result, advantageous reflectivity in the IR range can be achieved, without excessively reducing transmittance. The geometric layer thickness of the silver layer is preferably at least 5 nm, particularly preferably at least 8 nm. Thinner silver layers can lead to dewetting of the layer structure, Particularly preferably, the geometric layer thickness of the silver layer is from 10 nm to 14 nm or from 11 nm to 13 nm.

The reflection coating includes no dielectric layers whose refractive index is less than 1.9. In other words, all dielectric layers of the reflection coating have a refractive index of at least 1.9. Experiments by the inventors have shown that the use of low-refractive-index layers, such as silicon dioxide, has a detrimental effect on the ratio of the optical thicknesses and an associated unfavorable reflection behavior for p-polarized radiation occurs. It is a particular advantage of the present invention that the desired reflection properties can be achieved with relatively high-refractive-index dielectric layers alone. Since silicon oxide layers that have low deposition rates in magnetic field enhanced cathodic deposition are, in particular, considered for low-refractive-index layers with a refractive index of less than 1.9, the reflection coating according to the invention can thus be produced quickly and economically.

The reflection coating contains, above and below the silver layer, independently of one another in each case, a dielectric layer or a dielectric layer sequence with a refractive index of at least 1.9. The dielectric layers can, for example, be based on silicon nitride, zinc oxide, tin zinc oxide, mixed silicon-metal nitrides, such as silicon-zirconium nitride, zirconium oxide, niobium oxide, hafnium oxide, tantalum oxide, tungsten oxide, or silicon carbide. The oxides and nitrides mentioned can be deposited stoichiometrically, substoichiometrically, or superstoichiometrically. They can have dopants, for example, aluminum, zirconium, titanium, or boron. Layers of these materials with a refractive index of at least 1.9 are known per se in the form of individual layers and are accessible to the person skilled in the art via known methods. Preferably, physical vapor deposition methods, in particular magnetron sputtering, are used to deposit these layers.

The optical thickness of the upper dielectric layer or layer sequence is preferably from 100 nm to 200 nm, particularly preferably from 130 nm to 170 nm. The optical thickness of the lower dielectric layer or layer sequence is preferably from 30 nm to 100 nm, particularly preferably from 40 nm to 65 nm. Good results are achieved with this.

In an advantageous embodiment, a dielectric layer, which can be referred to as an antireflection layer and is preferably based on an oxide, for example, tin oxide, and/or a nitride, for example, silicon nitride, particularly preferably based on silicon nitride, is, in each case, arranged above and below the silver layer. Silicon nitride has proven to be a good choice due to its optical properties, its easy availability, and its high mechanical and chemical stability. The silicon is preferably doped, for example, with aluminum or boron. In the case of dielectric layer sequences, the silicon nitride based layer is preferably the top layer of the upper layer sequence or the bottom layer of the lower layer sequence. The geometric thickness of the upper antireflection layer is preferably from 50 nm to 100 nm, particularly preferably from 55 nm to 80 nm, in particular from 60 nm to 70 nm. The geometric thickness of the lower antireflection layer is preferably from 10 nm to 50 nm, particularly preferably from 15 nm to 40 nm, in particular from 20 nm to 35 nm.

In addition to the antireflection layer, further dielectric dielectric layers with a refractive index of at least 1.9 can optionally be present. Thus, the upper and lower layer sequence can, independently of one another, contain a matching layer to improve the reflectivity of the silver layer. The matching layers are preferably based on zinc oxide, particularly preferably zinc oxide $ZnO_{1-\delta}$ with $0 \leq \delta \leq 0.01$. The matching layers further preferably contain dopants. The matching layers can, for example, contain aluminum-doped zinc oxide (ZnO:Al). The zinc oxide is preferably deposited substoichiometrically relative to the oxygen in order to avoid reaction of excess oxygen with the silver-containing layer. The matching layers are preferably arranged between the silver layer and the antireflection layer. The geometric thickness of the matching layer is preferably from 5 nm to 30 nm, particularly preferably from 8 nm to 12 nm.

Refractive-index-enhancing layers that have a higher refractive index than the antireflection layer can also be present, likewise independently of one another, in the upper and the lower layer sequence. This can further improve and fine-tune the optical properties, in particular the reflection properties. The refractive-index-enhancing layers preferably contain a mixed silicon-metal nitride, such as mixed silicon-zirconium nitride, mixed silicon-aluminum nitride, mixed silicon titanium nitride, or mixed silicon-hafnium nitride, particularly preferably mixed silicon-zirconium nitride. The proportion of zirconium is preferably between 15 and 45 wt.-%, particularly preferably between 15 and 30 wt.-%. Alternative materials can be, for example, $WO_3$, $Nb_2O_5$, $Bi_2O_3$, $TiO_2$, and/or AlN. The refractive-index-enhancing layers are preferably arranged between the antireflection layer and the silver layering or between the matching layer (if present) and the antireflection layer. The geometric thickness of the refractive-index-enhancing layers is preferably from 5 nm to 30 nm, particularly preferably from 5 nm to 15 nm.

In one embodiment of the invention, exactly one lower dielectric layer with a refractive index of at least 1.9, preferably based on silicon nitride, is arranged below the electrically conductive layer. Likewise, exactly one upper dielectric layer with a refractive index of at least 1.9, preferably based on silicon nitride, is arranged above the electrically conductive layer. This results in the layer sequence, starting from the substrate: lower antireflection layer—silver layer—upper antireflection layer. The reflection coating preferably does not contain any other dielectric layers. The geometric thickness of the upper antireflection layer is preferably from 50 nm to 100 nm, particularly preferably from 55 nm to 80 nm, in particular from 60 nm to 70 nm. The geometric thickness of the lower antireflection layer is preferably from 10 nm to 50 nm, particularly preferably from 15 nm to 40 nm, in particular from 20 nm to 35 nm.

In another embodiment of the invention, a first lower dielectric layer (antireflection layer) and a second lower dielectric layer (matching layer) are arranged below the electrically conductive layer. Likewise, a first upper dielectric layer (antireflection layer) and a second upper dielectric layer (matching layer) are arranged above the electrically conductive layer. The antireflection and matching layers have a refractive index of at least 1.9. The antireflection layers are preferably based on silicon nitride; the matching layers, based on zinc oxide. The matching layers are preferably arranged between the respective antireflection layer and the silver layer. This results in the layer sequence, starting from the substrate: lower antireflection layer—lower matching layer—silver layer—upper matching layer—upper antireflection layer. The reflection coating preferably does not contain any other dielectric layers. The geometric thickness of the upper antireflection layer is preferably from 50 nm to 100 nm, particularly preferably from 55 nm to 80 nm, in particular from 60 nm to 70 nm. The geometric thickness of the lower antireflection layer is preferably from 10 nm to 50 nm, particularly preferably from 15 nm to 40 nm, in particular from 20 nm to 35 nm. The geometric thickness of the matching layers is preferably from 5 nm to 30 nm, particularly preferably from 8 nm to 12 nm.

In another embodiment of the invention, a first lower dielectric layer (antireflectlon layer), a second lower dielectric layer (matching layer), and a third lower dielectric layer (refractive-index-enhancing layer) are arranged below the electrically conductive layer. Likewise, a first upper dielectric layer (antireflection layer), a second upper dielectric layer (matching layer), and a third upper dielectric layer (refractive-index-enhancing layer) are arranged above the electrically conductive layer. The antireflection and matching layers and the refractive-index-enhancing layers have a refractive index of at least 1.9. The refractive-index-enhancing layers have a higher refractive index than the antireflection layers, preferably at least 2.1. The antireflection layers are preferably based on silicon nitride; the matching layers, based on zinc oxide; the refractive-index-enhancing layers, based on a mixed silicon-metal nitride, such as mixed silicon-zirconium nitride or mixed silicon-hafnium nitride. The matching layers preferably have the least distance from the silver layer, while the refractive-index-enhancing layers are arranged between the matching layers and the antireflection layers. This results in the layer sequence, starting from the substrate: lower antireflection layer—lower refractive-index-enhancing layer—lower matching layer—silver layer—upper matching layer—upper refractive-index-enhancing layer—upper antireflection layer. The reflection coating preferably does not contain any other dielectric layers. The geometric thickness of the upper antireflection layer is preferably from 50 nm to 100 nm, particularly preferably from 55 nm to 80 nm, in particular from 60 nm to 70 nm. The geometric thickness of the lower antireflection layer is preferably from 10 nm to 50 nm, particularly preferably from 15 nm to 40 nm, in particular from 20 nm to 35 nm. The geometric thickness of the matching layers is preferably from 5 nm to 30 nm, particularly preferably from 8 nm to 12 nm. The geometric thickness of the refractiveindex-enhancing layers is preferably from 5 nm to 30 nm, particularly preferably from 5 nm to 15 nm.

Since the upper and the lower dielectric layer sequence can be formed independently of one another, combinations of the above described embodiments are also possible; wherein the upper dielectric layer/layer sequence is formed according to one embodiment and the lower dielectric layer/layer sequence is formed according to a different one. This results in the following preferred layer sequences (in each case; starting from the substrate, i.e., the surface on which the reflection coating is deposited:

lower antireflection layer—silver layer—upper antireflection layer lower antireflection layer—silver layer—upper matching layer—upper antireflection layer lower antireflection layer—silver layer—upper matching layer—upper refractive-index-enhancing layer—upper antireflection layer lower antireflection layer—lower matching layer—silver layer—upper antireflection layer lower antireflection layer—lower matching layer—silver layer—upper matching layer—upper antireflection layer lower antireflection layer—lower matching layer—silver layer—upper matching layer—upper refractive-index-enhancing layer—upper antireflection layer lower antireflection layer—lower refractive-index-enhancing layer—lower matching layer—silver layer—upper antireflection layer lower antireflection layer—lower refractive-index-enhancing layer—lower matching layer—silver layer—upper matching layer—upper antireflection layer lower antireflection layer—lower refractive-index-enhancing layer—lower matching layer—silver layer—upper matching layer—upper refractive-index-enhancing layer—upper antireflection layer In an advantageous embodiment, the reflection coating includes at least one metallic blocking layer. The blocking layer can be arranged below and/or above the silver layer and preferably makes direct contact with the sliver layer. The blocking layer is then positioned between the silver layer and the dielectric layer/layer sequence. The blocking layer serves as oxidation protection for the silver layer in particular during temperature treatments of the coated pane, as typically occur during bending processes. The blocking layer preferably has a geometric thickness less than 1 nm, for example, 0.1 nm to 0.5 nm. The blocking layer is preferably based on titanium or a nickel-chromium alloy.

The blocking layer changes the optical properties of the reflection coating only insignificantly and is preferably present in all the embodiments described above. Particularly preferably, the blocking layer is arranged directly above the silver layer, i.e., between the silver layer and the upper dielectric layer (sequence), where it is particularly effective. This results in the following preferred layer sequences:

lower antireflection layer—silver layer—blocking layer—upper antireflection layer lower antireflection layer—silver layer—blocking layer—upper matching layer—upper antireflection layer lower antireflection layer—silver layer—blocking layer—upper matching layer—upper refractive-index-enhancing layer—upper antireflection layer lower antireflection layer—lower matching layer—silver layer—blocking layer—upper antireflection layer lower antireflection layer—lower matching layer—silver layer—blocking layer—upper matching layer—upper antireflection layer lower antireflection layer—lower matching layer—silver layer—blocking layer—upper matching layer upper—refractive-index-enhancing layer—upper antireflection layer lower antireflection layer—lower refractive-index-enhancing layer—lower matching layer—silver layer—blocking layer—upper antireflection layer lower antireflection layer—lower refractive-index-enhancing layer—lower matching layer—silver layer—blocking layer—upper matching layer—upper antireflection layer lower antireflection layer—lower refractive-index-enhancing layer—lower matching layer—silver layer—blocking layer—upper matching layer—upper refractive-index-enhancing layer—upper antireflection layer Optionally, in each case, an additional blocking layer can be arranged directly below the silver layer, i.e., between the silver layer and the lower dielectric layer (sequence).

The projector is arranged on the interior-side of the windshield and irradiates the windshield via the interior-side surface of the inner pane. It is directed toward the HUD region and irradiates it to generate the HUD projection. According to the invention, the radiation of the projector is predominantly p-polarized, i.e., has a p-polarized radiation component greater than 50%. The higher the proportion of the p-polarized radiation in the total radiation of the projector, the higher the intensity of the desired projection image and the lower the intensity of the undesired reflections on the surfaces of the windshield. The p-polarized radiation component of the projector is preferably at least 70%, particularly preferably at least 80%, and in particular at least 90%. In a particularly advantageous embodiment, the radiation of the projector is essentially purely p-polarized—the p-polarized radiation component is thus 100% or deviates only insignificantly therefrom. The indication of the polarization direction is based on the plane of incidence of the radiation on the windshield. The expression "p-polarized radiation" refers to radiation whose electric field oscillates in the plane of incidence. "S-polarized radiation" refers to radiation whose electric field oscillates perpendicular to the plane of incidence. The plane of incidence is generated by the vector of incidence and the surface normal of the windshield in the geometric center of the irradiated region.

The radiation of the projector preferably strikes the windshield with an angle of incidence from 45° to 70°, in particular from 55° to 70°. In an advantageous embodiment, the angle of incidence deviates from Brewster's angle by at most 10°. The p-polarized radiation is then reflected only insignificantly at the surfaces of the windshield such that no ghost image is generated. The angle of incidence is the angle between the vector of incidence of the projector radiation and the interior-side surface normal (i.e., the surface normal on the interior-side external surface of the windshield) in the geometric center of the HUD region. Brewster's angle for an air/glass transition in the case of soda lime glass, which is commonly used for window panes, is 56.5°. Ideally, the angle of incidence should be as close as possible to this Brewster's angle. However, angles of incidence of 65°, which are common for HUD projection assemblies, are easily implemented in vehicles and deviate only slightly from Brewster's angle can, for example, also be used such that the reflection of the p-polarized radiation increases only insignificantly.

Since the reflection of the projector radiation occurs substantially at the reflection coating and not at the external pane surfaces, it is not necessary to arrange the external pane surfaces at an angle relative to one another in order to avoid ghost images. The external surfaces of the windshield are, consequently, preferably arranged substantially parallel to one another. The thermoplastic intermediate layer is preferably not implemented wedge-like, but, instead, has a substantially constant thickness, in particular even in the vertical course between the upper edge and the lower edge of the windshield, just like the inner pane and the outer pane. A wedge-like intermediate layer would, in contrast, have a variable thickness, in particular an increasing thickness, in the vertical course between the lower edge and the upper edge of the windshield. The intermediate layer is typically formed from at least one thermoplastic film. Since standard films are significantly more economical than wedge films, the production of the windshield is significantly more economical.

The outer pane and the inner pane are preferably made of glass, in particular of soda lime glass, which is customary for window panes. In principle, however, the panes can also be made of other types of glass (for example, borosilicate glass, quartz glass, aluminosilicate glass) or transparent plastics (for example, polymethyl methacrylate or polycarbonate). The thickness of the outer pane and the inner pane can vary widely. Preferably used are panes with a thickness in the range from 0.8 mm to 5 mm, preferably from 1.4 mm to 2.5 mm, for example, those with the standard thicknesses of 1.6 mm or 2.1 mm.

The outer pane, the inner pane, and the thermoplastic intermediate layer can be clear and colorless, but also tinted or colored. In a preferred embodiment, the total transmittance through the windshield (including the reflection coating) is greater than 70%. The term "total transmittance" is based on the process for testing the light permeability of motor vehicle windows specified by ECE-R 43, Annex 3. § 9.1. The outer pane and the inner panes can, independently of one another, be non-prestressed, partially prestressed, or prestressed. If at least one of the panes is to be prestressed, this can be thermal or chemical prestressing.

In an advantageous embodiment, the outer pane is tinted or colored. This can reduce the exterior-side reflectivity of the windshield, making the impression of the pane more pleasing for an external viewer. However, in order to ensure the prescribed light transmittance of 70% for windshields (total transmittance), the outer pane should preferably have light transmittance of at least 80%, particularly preferably of at least 85%. Light transmittance describes the proportion of radiation within the visible spectrum in the spectral range from 380 nm to 780 nm transmitted at a transmittance angle of 0°. The light transmittance can be determined by methods known to the person skilled in the art using commercially available measuring instruments, for example, with spectrometers from the company Perkin Elmer. The inner pane and the intermediate layer are preferably clear, i.e., not tinted or colored. For example, green or blue colored glass can be used as the outer pane.

The windshield is preferably curved in one or a plurality of spatial directions, as is customary for motor vehicle window panes, wherein typical radii of curvature are in the range from approx. 10 cm to approx. 40 m. The windshield can, however, also be flat, for example, when it is intended as a pane for buses, trains, or tractors.

The thermoplastic intermediate layer contains at least one thermoplastic polymer, preferably ethylene vinyl acetate (EVA), polyvinyl butyral (PVB), or polyurethane (PU) or mixtures or copolymers or derivatives thereof, particularly preferably PVB. The intermediate layer is typically formed from a thermoplastic film. The thickness of the intermediate layer is preferably from 0.2 mm to 2 mm, particularly preferably from 0.3 mm to 1 mm.

The windshield is can be produced by methods known per se. The outer pane and the inner pane are laminated together via the intermediate layer, for example, by autoclave methods, vacuum bag methods, vacuum ring methods, calender methods, vacuum laminators, or combinations thereof. The bonding of the outer pane and the inner pane is customarily done under the action of heat, vacuum, and/or pressure.

The reflection coating is preferably applied by physical vapor deposition (PVD) onto a pane surface, particularly preferably by cathodic sputtering ("sputtering"), most particularly preferably by magnetron-enhanced cathodic sputtering ("magnetron sputtering"). The coating is preferably applied before lamination. Instead of applying the reflection coating on a pane surface, it can, in principle, also be provided on a carrier film that is arranged in the intermediate layer.

If the windshield is to be bent, the outer pane and the inner pane are subjected to a bending process, preferably before lamination and preferably after the coating process. Preferably, the outer pane and the inner pane are bent congruently together (i.e., at the same time and by the same tool), since, thus, the shape of the panes is optimally matched for the subsequently occurring lamination. Typical temperatures for glass bending processes are, for example, 500° C. to 700° C. This temperature treatment also increases the transparency and reduces the sheet resistance of the reflection coating.

The invention also includes the use of a windshield implemented according to the invention as a projection surface of a projection assembly for a head-up display, wherein a projector whose radiation is predominantly p-polarized is directed at the HUD region. The above-described preferred embodiments apply mutatis mutandis to the use.

The invention further includes the use of a projection assembly according to the invention as an HUD in a motor vehicle, in particular in a passenger car or a truck. Particularly preferably, the projection assembly as an HUD is used in combination with a sensor, in particular a camera, with the reflection coating positioned in the beam path of the sensor.

In the following, the invention is explained in detail with reference to drawings and exemplary embodiments. The drawings are schematic representations and are not true to scale. The drawings in no way restrict the invention.

Figure 2:
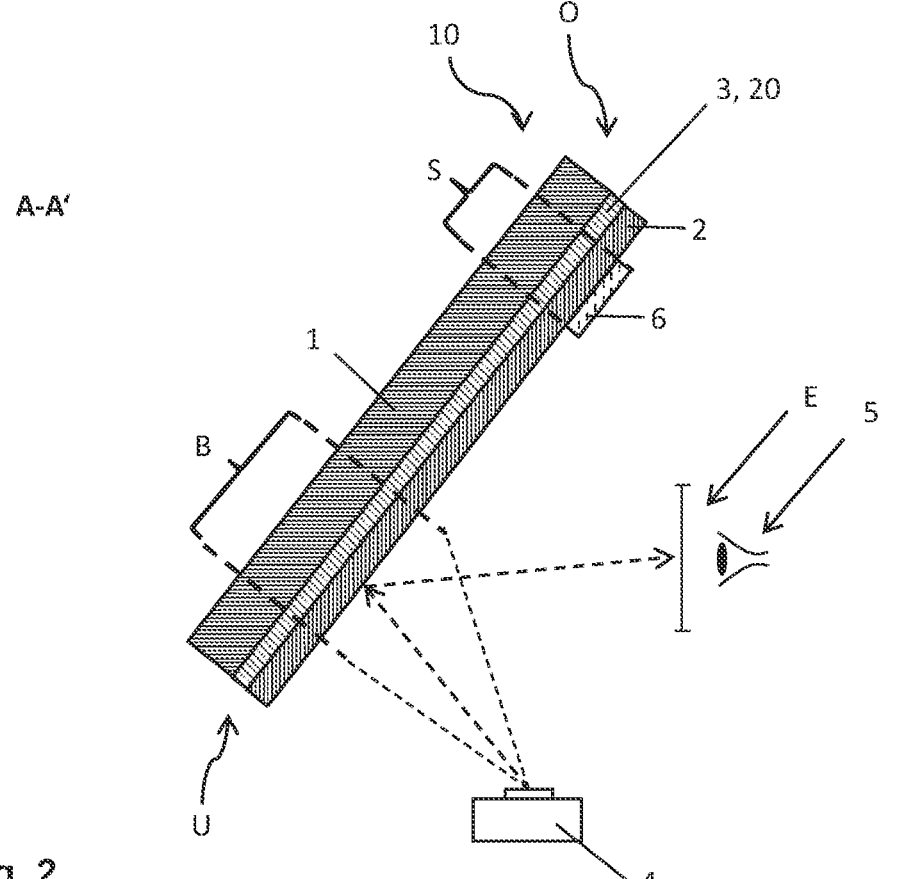
Figure 3:
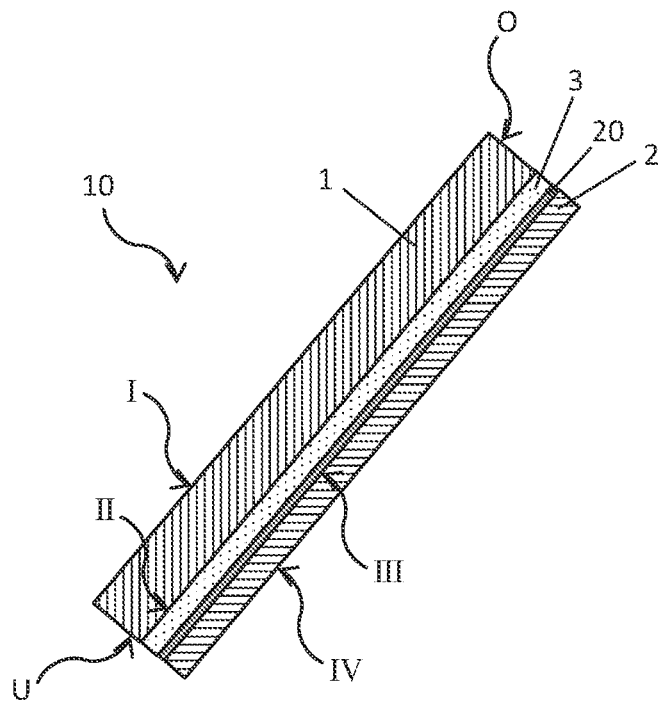
Figure 4:
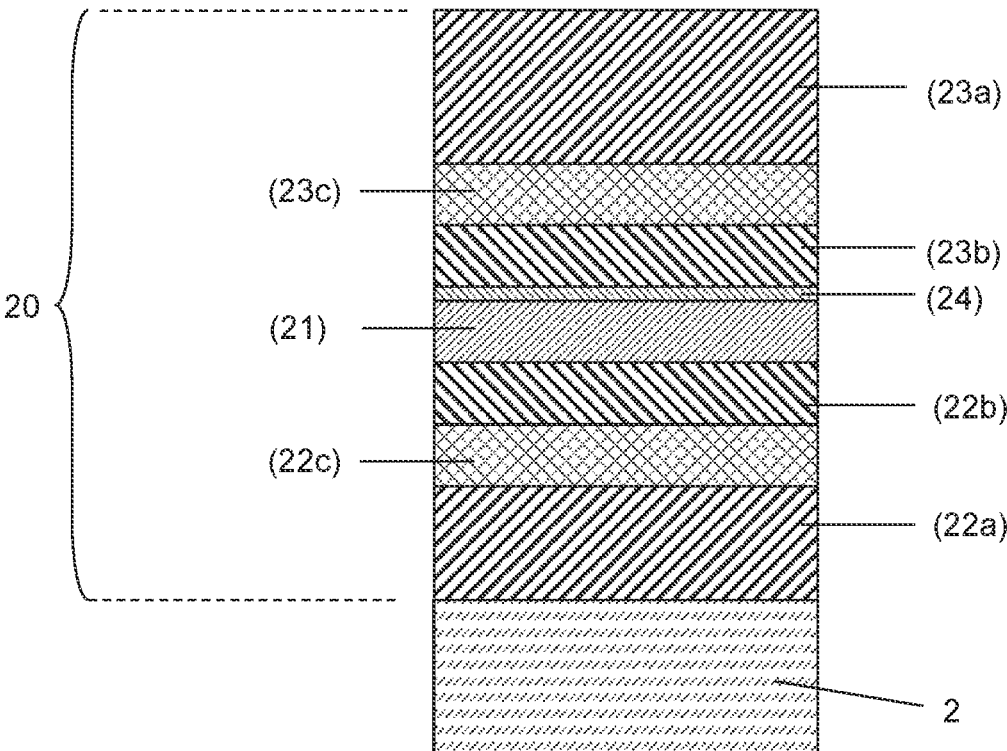
Figure 5:
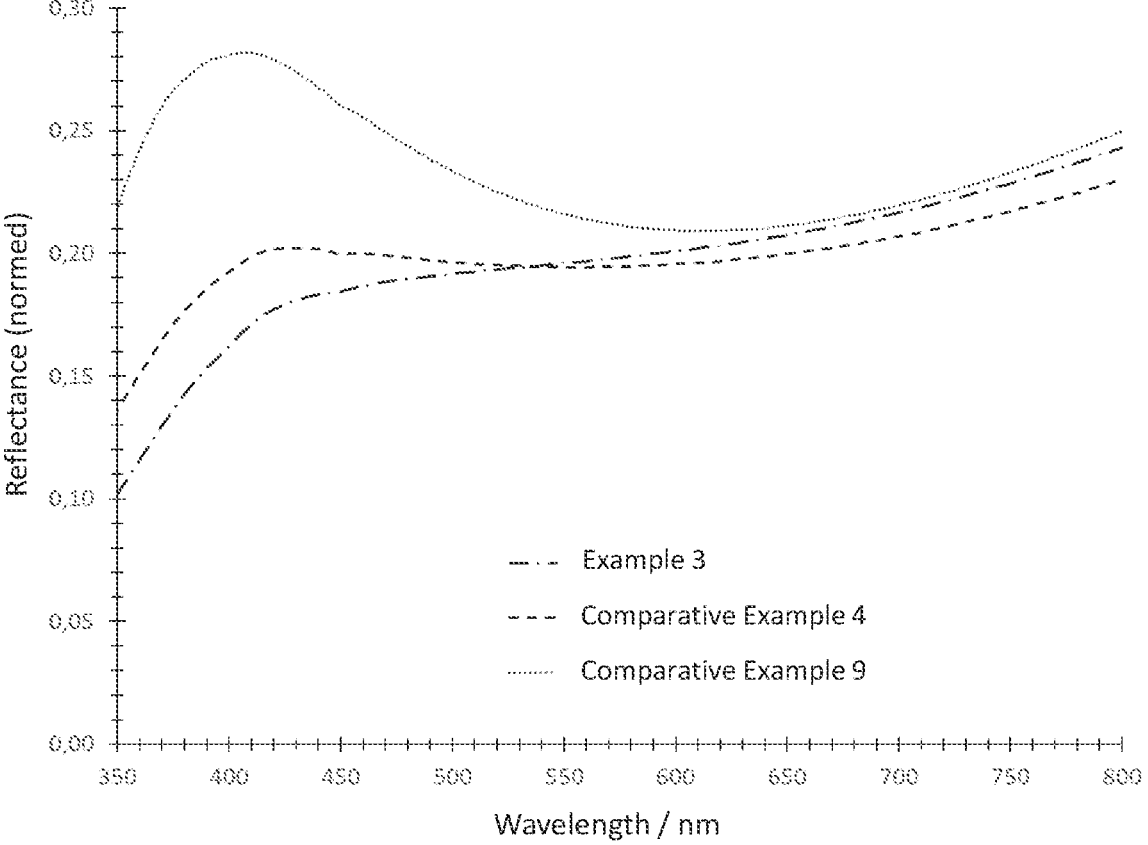

They depict:

FIG. 1 a plan view of a projection assembly according to the invention as a head-up display with an HUD region and a sensor region, FIG. 2 a cross-section along the section line A-A' through the projection assembly of FIG. 1, FIG. 3 a cross-section through a composite pane according to another embodiment of the projection assembly according to the invention along the section line A-A' of FIG. 1, FIG. 4 a cross-section through an embodiment of the reflection coating according to the invention on an inner pane, FIG. 5 reflection spectra of composite panes for p-polarized radiation in accordance with Example 3 and Comparative Examples 4 and 9.

FIGS. 1 and 2 depict a projection assembly for an HUD according to the invention, with FIG. 1 depicting a plan view and FIG. 2 depicting a cross-section along the section line AA' of FIG. 1.

The projection assembly comprises a windshield 10, in particular the windshield of a passenger car. The projection assembly also comprises a projector 4 that is directed at a region of the composite pane 10, In this region, commonly referred to as HUD region B, the projector 4 can generate images that are perceived by a viewer 5 (vehicle driver) as virtual images on the side of the composite pane 10 facing away from him if his eyes are situated within the so-called eyebox E. The windshield 10 is constructed from an outer pane 1 and an inner pane 2 that are joined to one another via a thermoplastic intermediate layer 3. Its lower edge U is arranged downward in the direction of the engine of the passenger car; its upper edge O, upward in the direction of the roof. In the installed position, the outer pane 1 faces the external surroundings; the inner pane 2, the vehicle interior. A reflection coating 20 is arranged between the inner face of the outer pane 1 and the inner face of the inner pane 2. This can be arranged on the inner face of the outer pane 1 or the inner face of the inner pane 2 or integrated into the thermoplastic intermediate layer 3.

FIG. 3 depicts another embodiment of a windshield 10 implemented according to the invention. The components of the projection assembly beyond the windshield 10 correspond to FIGS. 1 and 2 and are not depicted in FIG. 3. The outer pane 1 has an exterior-side surface I (also referred to as the outer face of the outer pane), which, in the installed position, faces the external surroundings, and an interior-side surface II (also referred to as the inner face of the outer pane), which, in the installed position, faces the interior. Likewise, the inner pane 2 has an exterior-side surface III (also referred to as the inner face of the inner pane), which, in the installed position, faces the exterior surroundings, and an interior-side surface IV (also referred to as the outer face of the inner pane), which, in the installed position, faces the interior. The outer pane 1 and the inner pane 2 are made, for example, of soda lime glass. The outer pane 1 has, for example, a thickness of 2.1 mm; the inner pane 2, a thickness of 1.6 mm or 2.1 mm. The intermediate layer 3 is made, for example, of a PVB film with a thickness of 0.76 mm. The PVB film has an essentially constant thickness, apart from any surface roughness common in the art—it is not implemented as a so-called "wedge film".

The exterior-side surface III of the inner pane 2 (outer face of the inner pane) is provided with a reflection coating 20 according to the invention, which is provided as a reflection surface for the projector radiation (and, possibly, additionally, as an IR reflection coating).

According to the invention, the radiation of the projector 4 is p-polarized, in particular essentially purely p-polarized. Since the projector 4 irradiates the windshield 10 at an angle of incidence of about 65°, which is close to Brewster's angle, the radiation of the projector is only insignificantly reflected at the external surfaces I, IV of the composite pane 10. In contrast, the reflection coating 20 according to the invention is optimized for reflection of p-polarized radiation. It serves as a reflection surface for the radiation of the projector 4 to generate the HUD projection.

FIG. 4 depicts the layer sequence of an embodiment of the reflection coating 20 according to the invention. The reflection coating 20 is a stack of thin layers. The reflection coating 20 comprises an electrically conductive layer 21 based on silver. A metallic blocking layer 24 is arranged directly above the electrically conductive layer 21. Above that, an upper dielectric layer sequence, consisting, from bottom to top, of an upper matching layer 23b, an upper refractive-index-enhancing layer 23c, and an upper antireflection layer 23a, is arranged. Below the electrically conductive layer 21, a lower dielectric layer sequence consisting, from top to bottom, of a lower matching layer 22b, a lower refractive-index-enhancing layer 22c, and a lower antireflection layer 22a, is arranged.

The layer structure depicted is intended merely as an example. Thus, the dielectric layer sequences can also include more or fewer layers, provided at least one dielectric layer is present above and below the conductive layer 21. The dielectric layer sequences also need not be symmetrical. Exemplary materials and layer thicknesses can be found in the following examples. The dielectric layers depicted in the silver layer were deposited by means of magnetron sputtering.

Tables 1a and 1b present the layer sequences of a windshield 10 with the reflection coating 20 on the exterior-side surface III of the inner pane 2 according to Examples 1 through 8 according to the invention, together with the materials and geometric layer thicknesses of the individual layers. Independently of one another, the dielectric layers can be doped, for example, with boron or aluminum.

TABLE 1a

| | | Layer Thickness | | | |
|---|---|---|---|---|---|
| Material | Reference Characters | Example 1 | Example 2 | Example 3 | Example 4 |
| Soda lime glass | 1 | 2.1 mm | 2.1 mm | 2.1 mm | 2.1 mm |
| PVB | 3 | 0.76 mm | 0.76 mm | 0.76 mm | 0.76 mm |
| $Si_3N_4$ | 20  23a | 45 nm | 50 nm | 55 nm | 60 nm |
| SiZrN | 23c | 10 nm | 10 nm | 10 nm | 10 nm |
| ZnO | 23b | 10 nm | 10 nm | 10 nm | 10 nm |
| NiCr | 24 | 0.3 nm | 0.3 nm | 0.3 nm | 0.3 nm |
| Ag | 21 | 12 nm | 12 nm | 12 nm | 12 nm |
| ZnO | 22b | 10 nm | 10 nm | 10 nm | 10 nm |
| SiZrN | 22c | 10 nm | 10 nm | 10 nm | 10 nm |
| $Si_3N_4$ | 22a | 10 nm | 10 nm | 10 nm | 10 nm |
| Soda lime glass | 2 | 2.1 mm | 2.1 mm | 2.1 mm | 2.1 mm |

TABLE 1b

| | | Layer Thickness | | | |
|---|---|---|---|---|---|
| Material | Reference Characters | Example 5 | Example 6 | Example 7 | Example 8 |
| Soda lime glass | 1 | 2.1 mm | 2.1 mm | 2.1 mm | 2.1 mm |
| PVB | 3 | 0.76 mm | 0.76 mm | 0.76 mm | 0.76 mm |
| $Si_3N_4$ | 20  23a | 40 nm | 45 nm | 45 nm | 55 nm |
| SiZrN | 23c | 10 nm | 10 nm | 0 nm | 10 nm |
| ZnO | 23b | 10 nm | 10 nm | 10 nm | 10 nm |
| NiCr | 24 | 0.3 nm | 0.3 nm | 0.3 nm | 0.3 nm |
| Ag | 21 | 12 nm | 12 nm | 12 nm | 12 nm |
| ZnO | 22b | 10 nm | 10 nm | 10 nm | 10 nm |
| SiZrN | 22c | 10 nm | 10 nm | 0 nm | 10 nm |
| $Si_3N_4$ | 22a | 5 nm | 5 nm | 10 nm | 5 nm |
| Soda lime glass | 2 | 2.1 mm | 2.1 mm | 2.1 mm | 2.1 mm |

For the comparison, Comparative Examples 1 to 8, which do not comply with the features according to the invention, were investigated. Their layer sequences are shown in Tables 2a and 2b.

TABLE 2a

| Material | Reference Characters | Layer Thickness | | | |
|---|---|---|---|---|---|
| | | Comparative Example 1 | Comparative Example 2 | Comparative Example 3 | Comparative Example 4 |
| Soda lime glass | 1 | 2.1 mm | 2.1 mm | 2.1 mm | 2.1 mm |
| PVB | 3 | 0.76 mm | 0.76 mm | 0.76 mm | 0.76 mm |
| $Si_3N_4$ 20 | 23a | 40 nm | 50 nm | 55 nm | 60 nm |
| SiZrN | 23c | 10 nm | 10 nm | 10 nm | 10 nm |
| ZnO | 23b | 10 nm | 10 nm | 10 nm | 10 nm |
| NiCr | 24 | 0.3 nm | 0.3 nm | 0.3 nm | 0.3 nm |
| Ag | 21 | 12 nm | 12 nm | 12 nm | 12 nm |
| ZnO | 22b | 10 nm | 10 nm | 10 nm | 10 nm |
| SiZrN | 22c | 10 nm | 10 nm | 10 nm | 10 nm |
| $Si_3N_4$ | 22a | 20 nm | 20 nm | 20 nm | 20 nm |
| Soda lime glass | 2 | 2.1 mm | 2.1 mm | 2.1 mm | 2.1 mm |

TABLE 2b

| Material | Reference Characters | Layer Thickness | | | |
|---|---|---|---|---|---|
| | | Comparative Example 5 | Comparative Example 6 | Comparative Example 7 | Comparative Example 8 |
| Soda lime glass | 1 | 2.1 mm | 2.1 mm | 2.1 mm | 2.1 mm |
| PVB | 3 | 0.76 mm | 0.76 mm | 0.76 mm | 0.76 mm |
| $Si_3N_4$ 20 | 23a | 45 nm | 55 nm | 60 nm | 65 nm |
| SiZrN | 23c | 10 nm | 0 nm | 0 nm | 0 nm |
| ZnO | 23b | 10 nm | 10 nm | 10 nm | 10 nm |
| NiCr | 24 | 0.3 nm | 0.3 nm | 0.3 nm | 0.3 nm |
| Ag | 21 | 12 nm | 12 nm | 12 nm | 12 nm |
| ZnO | 22b | 10 nm | 10 nm | 10 nm | 10 nm |
| SiZrN | 22c | 10 nm | 0 nm | 0 nm | 0 nm |
| $Si_3N_4$ | 22a | 20 nm | 10 nm | 10 nm | 10 nm |
| Soda lime glass | 2 | 2.1 mm | 2.1 mm | 2.1 mm | 2.1 mm |

The Examples and the Comparative Examples differ primarily in the ratio of the optical thickness of the upper dielectric layer sequence to the optical thickness of the lower dielectric layer sequence. The optical thickness is in each case the product of the geometric thickness shown in Tables 1a, 1b and 2a, 2b and the refractive index, using the following values: for $Si_3N_4$, 2.0; for SiZrN, 2.1; and for ZnO, 2.0. The optical thicknesses and their ratio are summarized in Tables 3a, 3b, 3c. The ratio φ describes the ratio of the optical thickness of the upper dielectric layer 23a or layer sequence 23a, 23b, and, optionally, 23c to the optical thickness of the lower dielectric layer 22a or layer sequence 22a, 22b, and, optionally, 22c. In addition to the optical thicknesses and the ratio of the optical thicknesses, Tables 3a, 3b, and 3c also present the polarization ratio of p-polarized radiation to s-polarized radiation in transmittance at different transmittance angles and the total transmittance $T_L$ in the visible range of the light spectrum. The transmittance angle used to investigate the polarization ratio is 61° in Table 3a; whereas Table 3b shows the polarization ratio of the layer stack at 67°, and Table 3c, at 55°.

TABLE 3a

| | Optical Thickness of the Upper Dielectric Layer Sequence | Optical Thickness of the Lower Dielectric Layer Sequence | Ratio φ | Polarization Ratio in Transmittance (p-pol./s-pol.) at 61° | $T_L$ in % |
|---|---|---|---|---|---|
| Example 1 | 131 | 61 | 2.14 | 1.40 | 75.0 |
| Example 2 | 141 | 61 | 2.31 | 1.41 | 73.5 |
| Example 3 | 151 | 61 | 2.48 | 1.42 | 71.9 |
| Example 4 | 161 | 61 | 2.64 | 1.43 | 70.5 |
| Example 5 | 121 | 51 | 2.37 | 1.41 | 74.9 |
| Example 6 | 131 | 51 | 2.57 | 1.42 | 73.3 |
| Example 7 | 110 | 40 | 2.75 | 1.42 | 71.9 |
| Example 8 | 151 | 51 | 2.96 | 1.44 | 70.2 |
| Comparative Example 1 | 121 | 81 | 1.49 | 1.37 | 78.4 |
| Comparative Example 2 | 141 | 81 | 1.74 | 1.38 | 75.5 |
| Comparative Example 3 | 151 | 81 | 1.86 | 1.38 | 74.0 |
| Comparative Example 4 | 161 | 81 | 1.99 | 1.39 | 72.5 |
| Comparative Example 5 | 131 | 81 | 1.62 | 1.37 | 77.0 |
| Comparative Example 6 | 130 | 40 | 3.25 | 1.44 | 68.6 |
| Comparative Example 7 | 140 | 40 | 3.50 | 1.46 | 66.9 |
| Comparative Example 8 | 150 | 40 | 3.75 | 1.47 | 65.2 |

TABLE 3b

| | Optical Thickness of the Upper Dielectric Layer Sequence | Optical Thickness of the Lower Dielectric Layer Sequence | Ratio φ | Polarization Ratio in Transmittance (p-pol./s-pol.) at 67° | $T_L$ in % |
|---|---|---|---|---|---|
| Example 2 | 141 | 61 | 2.31 | 1.56 | 73.5 |
| Example 3 | 151 | 61 | 2.48 | 1.59 | 71.9 |
| Comparative Example 1 | 121 | 81 | 1.49 | 1.52 | 78.4 |

TABLE 3c

| | Optical Thickness of the Upper Dielectric Layer Sequence | Optical Thickness of the Lower Dielectric Layer Sequence | Ratio φ | Polarization Ratio in Transmittance (p-pol./s-pol.) at 55° | $T_L$ in % |
|---|---|---|---|---|---|
| Example 2 | 141 | 61 | 2.31 | 1.30 | 73.5 |
| Example 3 | 151 | 61 | 2.48 | 1.32 | 71.9 |
| Comparative Example 1 | 121 | 81 | 1.49 | 1.26 | 78.4 |

In order for the windshield according to the invention to be approved as a windshield in accordance with legal requirements, the total transmittance $T_L$ through the windshield (including the reflection coating) must be at least 70% according to ECE-R 43, Annex 3, § 9.1. At the same time, for the compatibility of the HUD projection assembly with camera systems, the highest possible polarization ratio of p-polarized radiation to s-polarized radiation in transmittance must be present. In particular, polarization ratios of at least 1.41 at a transmittance angle of 61°, at least 1.59 at a transmittance angle of 67°, and 1.28 at a transmittance angle of 55° must be obtained. This is advantageous for meeting the specifications required for common camera systems. In Examples 1 to 8, where the ratio φ is within the range according to the invention, good polarization ratios are achieved with a total transmittance of at least 70%. Accordingly, the HUD projection assembly according to the invention is, in particular, suitable for use with camera systems.

FIG. 5 depicts reflection spectra of composite panes 10 with a fixed structure in accordance with FIG. 3, wherein, respectively, layer structures according to the invention and not according to the invention are shown in accordance with Example 3 of Table 1a and Comparative Example 4 of Table 2a are shown. For better classification of the spectra of Example 3 and Comparative Example 4, a reflection spectrum of a composite pane with a layer structure not according to the invention, in accordance with Comparative Example 9 of Tables 4a and 4b is also shown. The reflection spectra were recorded with a light source that emits p-polarized radiation of uniform intensity in the spectral range observed, when irradiated via the inner pane 2 (the so-called interior-side reflection) at an angle of incidence of 65° relative to the interior-side surface normal. The reflection measurement is thus approximated to the situation in the projection assembly.

TABLE 4a

| Material | Reference Characters | | Layer Thickness Comparative Example 9 |
|---|---|---|---|
| Soda lime glass | 1 | | 2.1 mm |
| PVB | 3 | | 0.76 mm |
| SiN | 20 | 23a | 30 nm |
| SiZrN | | 23c | 10 nm |
| ZnO | | 23b | 10 nm |
| NiCr | | 24 | 0.3 nm |
| Ag | | 21 | 13 nm |
| ZnO | | 22b | 10 nm |
| SiZrN | | 22c | 10 nm |
| SiN | | 22a | 50 nm |
| Soda lime glass | 2 | | 2.1 mm |

TABLE 4b

| | Optical Thickness of the Upper Dielectric Layer Sequence | Optical Thickness of the Lower Dielectric Layer Sequence | Ratio φ |
|---|---|---|---|
| Comparative Example 9 | 102 | 142 | 0.72 |

From the graphic representation of the spectra, it can be seen that Example 3 according to the invention with the ratio according to the invention of the optical thicknesses of the upper and lower dielectric layer or layer sequence has a profile similar to Comparative Example 4 not according to the invention. In both cases, a comparatively smooth spectrum is achieved in the spectral range of interest from 400 nm to 680 nm. For better classification thereof, a spectrum of a composite pane according to Comparative Example 9 not according to the invention is shown. In the case of Comparative Example 9, although relatively high averaged reflection values can also be achieved, the spectrum is, however, subject to strong fluctuations in the relevant spectral range from 400 nm to 680 nm, which can lead to undesirable color shifts of the HUD image as well as to a poorer color impression of the pane for the viewer. In contrast, the comparatively smoother spectra of 3 and Comparative Example 4 result in a more color-neutral display of the HUD projection. In addition, the general color impression of the pane is improved. The comparison of Example 3 according to the invention with Comparative Example 4 shows that the advantageous HUD properties of the composite pane are retained even after optimization of the layer structure according to the invention in terms of its camera compatibility. The HUD projection assembly according to the invention is thus particularly suitable for use with camera systems.

All of the panes had light transmittance greater than 70% such that they can be used as windshields.

LIST OF REFERENCE CHARACTERS (10) windshield
(1) outer pane
(2) inner pane
(3) thermoplastic intermediate layer
(4) projector
(5) viewer/vehicle driver
(6) sensor
(20) reflection coating
(21) electrically conductive layer
(22a) first lower dielectric layer/antireflection layer
(22b) second lower dielectric layer/matching layer
(22c) third lower dielectric layer/refractive-index-enhancing layer
(23a) first upper dielectric layer/antireflection layer
(23b) second upper dielectric layer/matching layer
(23c) third upper dielectric layer/refractive-index-enhancing layer
(24) metallic blocking layer
(O) upper edge of the windshield 10
(U) lower edge of the windshield 10
(B) HUD region of the windshield 10
(E) eyebox
(S) sensor region of the windshield 10
(I) exterior-side surface of the outer pane 1, facing away from the intermediate layer 3
(II) interior-side surface of the outer pane 1, facing the intermediate layer 3
(III) exterior-side surface of the inner pane 2, facing the intermediate layer 3
(IV) interior-side surface of the inner pane 2, facing away from the intermediate layer 3

The invention claimed is:

1. A projection assembly for a head-up display (HUD), comprising:
   a windshield with an HUD region, comprising an outer pane having an outer face and an inner face and an inner pane having an inner face and an outer face, wherein the inner face of the outer pane is joined to the inner face of the inner pane via a thermoplastic intermediate layer, and
   a projector, which is directed at the HUD region;
   wherein
   a radiation of the projector is predominantly p-polarized, and
   the windshield is provided with a reflection coating, which is adapted to reflect p-polarized radiation;
   and wherein
   the reflection coating has exactly one electrically conductive layer based on silver, a lower dielectric layer or lower dielectric layer sequence with a refractive index of at least 1.9 is arranged below the electrically conductive layer, an upper dielectric layer or upper dielectric layer sequence with a refractive index of at least 1.9 is arranged above the electrically conductive layer, a ratio of an optical thickness of the upper dielectric layer or upper dielectric layer sequence to an optical thickness of the lower dielectric layer or lower dielectric layer sequence is between 2.10 and 3.20, the reflection coating includes no dielectric layers with a refractive index less than 1.9, and the windshield includes a sensor region, in which radiation passes through the reflection coating and is detectable by a sensor provided in the sensor region.

2. The projection assembly according to claim 1, wherein the ratio of the optical thickness of the upper dielectric layer or upper dielectric layer sequence to the optical thickness of the lower dielectric layer or lower dielectric layer sequence is between 2.14 and 3.10.

3. The projection assembly according to claim 2, wherein the ratio is between 2.30 and 2.98.

4. The projection assembly according to claim 1, wherein the sensor is affixed in the sensor region on the outer face of the inner pane.

5. The projection assembly according to claim 4, wherein the sensor is based on ultrasound, radar, lidar, and/or camera technology.

6. The projection assembly according to claim 1, wherein
exactly one lower dielectric layer with a refractive index of at least 1.9 is arranged below the electrically conductive layer, and/or
exactly one upper dielectric layer with a refractive index of at least 1.9 is arranged above the electrically conductive layer.

7. The projection assembly according to claim 6, wherein the exactly one lower dielectric layer with a refractive index of at least 1.9 includes silicon nitride, and/or wherein the exactly one upper dielectric layer with a refractive index of at least 1.9 includes silicon nitride.

8. The projection assembly according to claim 1, wherein
the lower dielectric layer sequence includes a first lower dielectric layer and a second lower dielectric layer, with a refractive index of at least 1.9 that are arranged below the electrically conductive layer, and/or
the upper dielectric layer sequence includes a first upper dielectric layer and a second upper dielectric layer, with a refractive index of at least 1.9 that are arranged above the electrically conductive layer.

9. The projection assembly according to claim 8, wherein
the first lower dielectric layer includes silicon nitride and the second lower dielectric layer includes zinc oxide, and/or
the first upper dielectric layer includes silicon nitride and the second upper dielectric layer includes zinc oxide.

10. The projection assembly according to claim 1, wherein
the lower dielectric layer sequence includes a first lower dielectric layer, a second lower dielectric layer, and a third lower dielectric layer, with a refractive index of at least 1.9 that are arranged below the electrically conductive layer, and/or
the upper dielectric layer sequence includes a first upper dielectric layer, a second upper dielectric layer, and a third upper dielectric layer, with a refractive index of at least 1.9 that are arranged above the electrically conductive layer.

11. The projection assembly according to claim 10, wherein
the first lower dielectric layer includes silicon nitride, the second lower dielectric layer includes tin oxide, and the third lower dielectric layer includes a mixed silicon-metal nitride, and/or
the first upper dielectric layer includes silicon nitride, the second upper dielectric layer includes tin oxide, and the third upper dielectric layer includes a mixed silicon-metal nitride.

12. The projection assembly according to claim 11, wherein the mixed silicon-metal nitride of the third lower dielectric layer and/or the third upper dielectric layer is mixed silicon-zirconium nitride or mixed silicon-hafnium nitride.

13. The projection assembly according to claim 1, wherein the reflection coating includes at least one metallic blocking layer, which is arranged above and/or below the electrically conductive layer and has a geometric thickness of less than 1 nm.

14. The projection assembly according to claim 1, wherein the outer pane is tinted or colored and has light transmittance of at least 80%.

15. The projection assembly according to claim 1, wherein the radiation of the projector is substantially purely p-polarized.

16. The projection assembly according to claim 1, wherein the radiation of the projector strikes the windshield with an angle of incidence of 55° to 70°.

17. The projection assembly according to claim 1, wherein the electrically conductive layer has a geometric thickness of 10 nm to 14 nm.

18. The projection assembly according to claim 1, wherein external surfaces of the windshield are arranged substantially parallel to one another.

19. The projection assembly according to claim 1, wherein the reflection coating is arranged on the surface of the outer pane or the inner pane facing the thermoplastic intermediate layer or within the thermoplastic intermediate layer.

\* \* \* \* \*